United States Patent [19]

Carveth et al.

[11] Patent Number: 4,718,215

[45] Date of Patent: Jan. 12, 1988

[54] APPARATUS AND METHOD FOR ATTACHING FITMENTS TO FLEXIBLE CONTAINERS

[75] Inventors: Peter Carveth, Glen Ellyn; Albert Stone, Guffalo Grove; L. Alan White, Gurnee, all of Ill.

[73] Assignee: Baxter Travenol Laboratories, Inc., Deerfield, Ill.

[21] Appl. No.: 802,418

[22] Filed: Nov. 27, 1985

[51] Int. Cl.$^4$ .......................................... B65B 61/18
[52] U.S. Cl. ...................................... 53/410; 53/128; 53/133; 53/450; 53/550; 156/566
[58] Field of Search ................. 53/300, 128, 410, 477, 53/416, 562, 133, 412, 129; 198/626; 493/213, 341, 350, 380, 439, 470, 205, 221, 220; 156/552, 566, 567

[56] References Cited

U.S. PATENT DOCUMENTS

| | | |
|---|---|---|
| 2,850,422 | 9/1958 | Welch ............................... 53/128 X |
| 2,995,174 | 8/1961 | Wang ............................... 156/552 X |
| 3,244,576 | 4/1966 | Swartz ............................. 493/213 X |
| 3,395,261 | 7/1968 | Leatherman et al. . |
| 3,396,258 | 9/1968 | Leatherman . |
| 3,461,014 | 9/1969 | James . |
| 3,462,336 | 9/1969 | Leatherman . |
| 3,510,619 | 5/1970 | Leatherman . |
| 3,528,867 | 10/1970 | Leatherman et al. . |
| 3,652,361 | 3/1972 | Leatherman . |
| 3,709,775 | 1/1973 | James . |
| 3,802,985 | 4/1974 | Leatherman . |
| 3,840,254 | 10/1974 | Shatzkin . |
| 3,879,247 | 4/1975 | Dickey ............................. 53/477 X |
| 3,894,381 | 7/1975 | Christine et al. ................ 53/410 X |
| 3,900,360 | 9/1975 | Leatherman . |
| 3,902,940 | 10/1975 | Heller, Jr. et al. . |
| 3,923,580 | 12/1975 | Leatherman . |
| 3,941,641 | 3/1976 | Heller, Jr. et al. . |
| 3,945,867 | 3/1976 | Heller, Jr. et al. . |
| 3,996,090 | 12/1976 | Leatherman . |
| 4,000,760 | 1/1977 | Heller, Jr. et al. . |
| 4,029,837 | 6/1977 | Leatherman . |
| 4,035,547 | 7/1977 | Heller, Jr. et al. . |
| 4,055,032 | 10/1977 | Hammond ....................... 53/410 |
| 4,067,765 | 1/1978 | Heller, Jr. et al. . |
| 4,095,390 | 6/1978 | Knudsen ......................... 53/300 X |
| 4,290,253 | 9/1981 | Domke et al. .................. 53/410 X |
| 4,352,669 | 10/1982 | Norton ............................ 493/213 |
| 4,384,915 | 5/1983 | Utsumi ........................... 156/566 X |
| 4,512,136 | 4/1985 | Christine ........................ 53/410 |
| 4,584,819 | 4/1986 | Hakansson .................... 53/128 X |

OTHER PUBLICATIONS

Hellerbond New Technology for Joining Materials. Electromagnetic Bonding of Thermoplastic.
Cookazian "Electromagnetic Bonding of Thermoplastics: Another Method of Joining Like and Unlike Plastics", Plastic Design and Processing, Sep. 1975.
Cookazain, "Bonding Plastics by Induction Heating", SPE Journal, Oct. 1970.
"Electromagnetic Bonding—It's Fast, Clean and Simple", Plastics World, Jul. 1970.
"Inducting Heating Activates Adhesives", Design News, Apr. 5, 1971.
Cookazian, "Induction Bonding", Modern Plastics Encyclopedia, 1971.
"Induction Heating In The Medical Field", vol. 2, No. 7, High Frequency Heating Review.

Primary Examiner—Robert L. Spruill
Assistant Examiner—Steven P. Weihrouch
Attorney, Agent, or Firm—Robert M. Barrett; Paul C. Flattery

[57] ABSTRACT

The present invention provides a method and apparatus for attaching fitments to filled flexible containers. A series of interconnected filled flexible containers are conveyed between a pair of belt conveyors which limit lateral movement of the containers. A third conveyor urges fitments against the bottoms of the containers and the fitments are sealed to the containers.

26 Claims, 5 Drawing Figures

APPARATUS AND METHOD FOR ATTACHING FITMENTS TO FLEXIBLE CONTAINERS

BACKGROUND OF THE INVENTION

The present invention relates to apparatus and methods for creating containers with fitments attached thereto. Specifically, the present invention relates to a method and apparatus for attaching fitments to flexible containers.

Flexible containers with fitments are utilized in a variety of arts, e.g., medical industry, dairy industry, wine industry. A fitment functions as an injection site for accessing the solution in the flexible container. An example of such a container is the VIAFLEX ® collapsible plastic container for parenteral solutions sold by Travenol Laboratories, Inc., Deerfield, Illinois. As used herein, the term fitments includes, without limitation, ports, valves, and other means for accessing containers.

There are a variety of ways by which fitments are attached to webs of film. The fitment may be attached by being inserted through a hole that is punched in a web of film. The fitment is then sealed within the hole to the web of film. The fitment may also be captured and sealed between two sheets of film. It is also now known, to seal the fitment to a web of film by melting a portion of the film to the fitment utilizing a hot pin.

Flexible containers can be constructed in a variety of ways. One method is to construct the flexible container in a form, fill and seal packaging machine. As its name implies, typically the form, fill and seal packaging machine includes the steps of: folding a web of film; sealing a top side of the web of film onto itself; filling the web of film with the product to be housed; and sealing sides of the web of film to create a container or pouch. During the form, fill and seal process a fitment may be attached to the web of film and thereby the container. Typically, the prior methods of sealing a fitment to a web of film in a form, fill and seal apparatus involve the process of piercing the web of film. This in turn violates the environment inside the web of film which must be sterile in such applications as medical and food product uses.

The attachment of the fitments to the web of film in form, fill and seal packaging machines causes the process to be intermittant. Typically, the fitments are attached to the web of film prior to the web of film being filled with the product the containers are to house. These prior form, fill and seal apparatus that attach fitments to the web of film typically operate at speeds of approximately 20-40 bags per minute.

In attaching fitments to the web of film one must also be concerned with the sterility of the attachment site. This is especially critical if the resultant product is to be used to house a medical or nutrition product that is to be administered to a patient. To this end, usually in the medical industry, the resultant products are terminally sterilized. However, this requires an additional step in the creation of the product.

Accordingly, there is a need for a fitment attaching apparatus and method that overcomes the disadvantages of the prior art.

SUMMARY OF THE INVENTION

The present invention provides an apparatus for attaching fitments to filled flexible containers. The apparatus includes a coating wheel for coating a surface of the fitments with a material for securing the fitments to the flexible containers. The apparatus also includes a continuous conveyor for delivering the fitments in juxtaposition to the flexible containers and urging the fitments against the containers.

Preferably, the material for securing the fitments to the containers is a hot melt adhesive. In a further preferred embodiment the material for securing the fitments is a particulate slurry, and the apparatus includes an apparatus for inductively welding the fitments to the flexible containers.

Accordingly, it is an advantage of the present invention to provide a high speed method of creating flexible containers with fitments.

Another advantage of the present invention is it provides an apparatus for attaching fitments to filled flexible containers.

A still further advantage of the present invention is to provide a method of attaching fitments to filled flexible containers without violating the environment of the container.

An additional advantage of the present invention is that it provides a method of attaching fitments to flexible containers in a form, fill and seal packaging apparatus.

Another advantage of the present invention is that it provides an apparatus for attaching fitments to flexible containers through induction welding.

Furthermore, an advantage of the present invention is that it allows flexible containers with fitments to be created in a form, fill and seal packaging apparatus at speeds of approximately 100 to about 1000 bags per minute.

Additionally, an advantage of the present invention is that the method of attaching the fitments sterilizes the attachment site.

A still further advantage of the present invention is that it provides a flexible system that can be adapted to satisfy a variety of packaging needs.

Another advantage of the apparatus and method of the present invention is that the system is continuous.

Still another advantage of the present invention is that it gives excellent adhesion of the fitments to the flexible containers and assures high reliability of a sterile connection at the seal.

Furthermore, an advantage of the present invention is that the adhesion forces of the fitment to the flexible container are controllable, reliable, and reproducable.

Moreover, an advantage of the present invention is that the fitment can be attached to the flexible containers through electromagnetic induction adhesive bonding.

Additionally, an advantage of the present invention is that it provides a method for attaching a fitment to a flexible container without compromising the integrity or sterility of the container.

A still further advantage of the present invention is that the fitments can be attached after filled flexible containers have been created in an aseptic environment without subjecting the aseptic system to possible failure.

Additional features and advantages are described in, and will be apparent from, the detailed description of the presently preferred embodiments and from the drawings.

DETAILED DESCRIPTION OF THE PRESENTLY PREFERRED EMBODIMENTS OF THE INVENTION

Form, fill and seal packaging apparatus are known in the art. A typical form, fill and seal packaging apparatus includes: an apparatus for dispensing a web of film; a former for folding the web of film; an apparatus for creating a top seal; an apparatus for creating side seals in the web of film; an apparatus for dispensing the product that is to be housed in the flexible container created; and an apparatus for attaching fitments. The present invention provides an apparatus and method for attaching fitments to a web of film.

The apparatus for attaching fitments 20 can be adapted to work with most any form, fill and seal packaging apparatus known in the art including horizontal and vertical form, fill and seal packaging machines. Examples of these machines are illustrated in U.S. Pat. Nos. 3,667,188; 3,813,845 and 3,894,381. Of course, the apparatus for attaching fitments 20 may be used with any packaging machine. Indeed, since the apparatus attaches fitments after the containers are created the method of creating the container should not determine whether the apparatus can be used.

The apparatus 20 is specifically designed to work with the fitments 12 disclosed in copending U.S. patent application Ser. No. 802,640 now U.S. Pat. No. 4,657,152, filed in the names of Peter Carveth, Leonard White, and Albert Stone, and entitled "Thermoplastic Foam Fitment." Again however, the apparatus for attaching fitments 20 can be utilized with other types of fitments.

Figure 1:
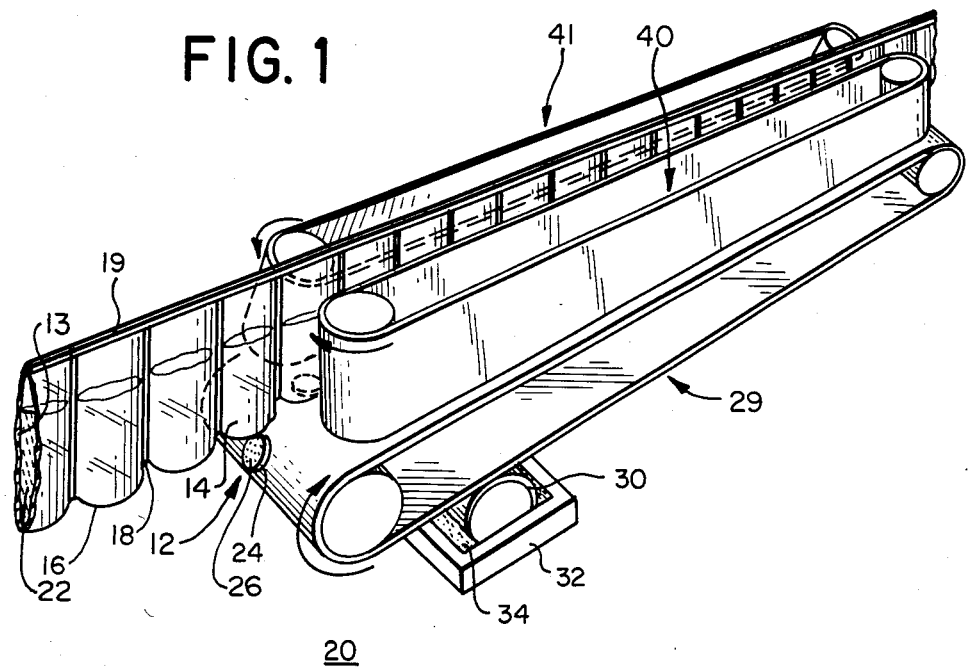
FIG. 1 illustrates a top elevational perspective view of the apparatus for attaching fitments of the present invention.

Referring now to FIG. 1, an embodiment the apparatus for attaching fitments 20 is illustrated. As illustrated, at this stage in the process, the web of film 13 has been created into flexible containers 14 that are filled with the product 22 to be housed. To this end, the flexible containers 14 include a top seal 19 and side seals 18.

Figure 2:
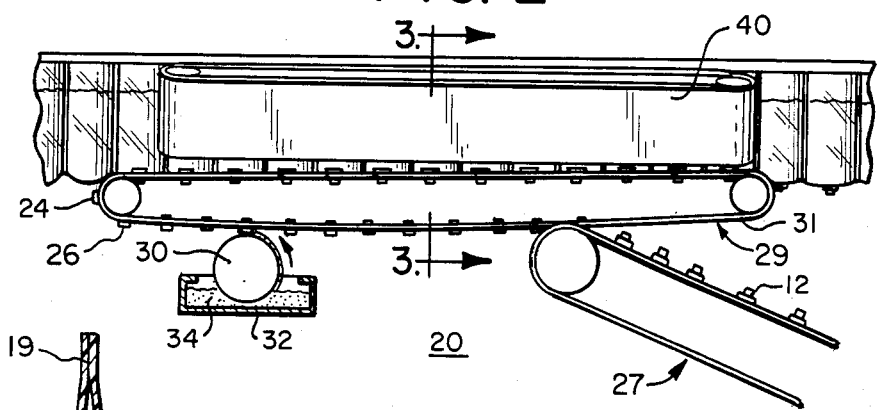
FIG. 2 illustrates a cross-sectional view of the apparatus for attaching fitments of FIG. 1.

Referring now to FIGS. 1 and 2, in the embodiment of the invention illustrated, the fitments 12 are fed from a bin (not shown) into a first conveyor belt 27. The first conveyor belt 27 delivers the fitments 12 to a continuous conveyor belt 29. Although a first conveyor belt 27 is illustrated, the apparatus 20 may include instead, a vibration table, worm screw, vibration unit, chute, turntable or other apparatus for delivering the fitments 12 to the continuous conveyor belt.

The continuous conveyor belt 29 includes a row of apertures 31 in which the fitments 12 are received. The apertures 31 have a circumference that is slightly greater than the outer circumference of the fitments 12 so that the fitments snap therein. The fitments 12 are received within the apertures 31 and oriented on the continuous conveyor belt 29 so that the bottom surface 24 of each fitment is facing outwardly from the continuous conveyor belt 29.

Figure 3:
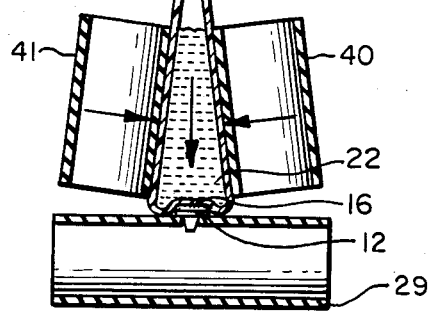
FIG. 3 illustrates a cross-sectional view of the apparatus for attaching fitments of FIG. 1 taken along lines 3—3 of FIG. 2.

In the embodiment illustrated in FIGS. 1–3, the continuous conveyor belt 29 is oriented so that the fitments 12 pass by a coating wheel 30. The coating wheel 30 may be any coating wheel known in the art and can include coating wheels manufactured by Bostik or Nordson, for example. The coating wheel 30 is located in a bath 32 that may include a hot melt adhesive 34. Accordingly, as the fitments 12 pass by the coating wheel 30 the bottom surface 24 is coated with the hot melt adhesive 34.

The hot melt adhesive 34 may include any adhesives known in the art including the following adhesives: ethyl vinyl acetate; Kraton; low density polyethylene; or blends thereof. The hot melt adhesive is preferably maintained at a temperature of between 300° F. to about 600° F.

After the fitments 12 have passed by the coating wheel 30 they have an adhesive layer 26 coated on their bottom surface 24. The fitments 12 are then moved into juxtaposition to the filled flexible containers 14. The continuous conveyor belt 29 continues to move the fitments 12 until they are urged against the flexible containers 14. Due to the location of the continuous conveyor belt 29, and the weight of the flexible container 14, the fitments 12 are urged against the containers 14, and specifically the bottom wall 16 of the flexible containers. Preferably the bottom wall 16 and fitment 12 are urged against each other at a pressure of approximately 15 to about 20 pounds per square inch (psi). Preferably, this contact is maintained for a time of between approximately 1 to about 3 seconds. During this time the hot adhesive melt will cause the fitment 12 to be sealed to the bottom wall 16 of the flexible container 14. As can be seen, the attachment of the fitment 12 to the flexible container 14 is a continuous process and not intermittent as is typically the case with fitment attaching apparatus.

In order to ensure that there is sufficient pressure at the contact surface of the fitment and the container, conveyor belts 40 and 41 may be located on each side of the filled flexible containers 14. The conveyor belts 40 and 41 function to force the fluid or product within the containers 14 downwardly towards the bottom wall 16 of the container and accordingly against the fitments 12.

Instead of a hot melt adhesive 34 the fitments 12 may be coated with a solvent or other means of adhering the fitments 12 to the flexible containers 14. As set forth in detail below, the hot melt adhesive 34 can be substituted for by a particulate slurry.

Figure 4:
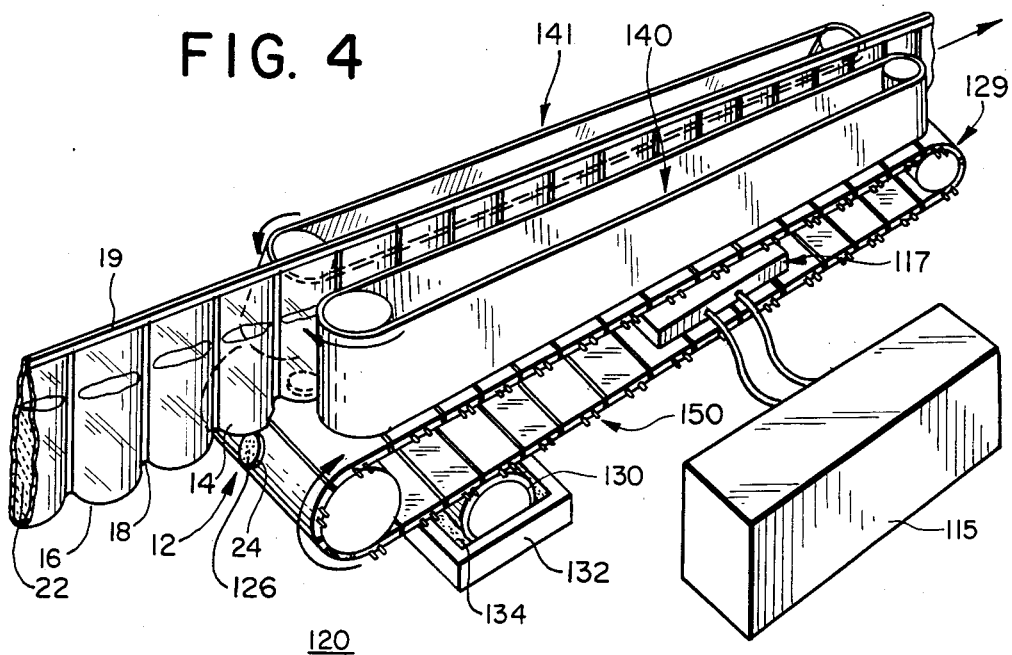
FIG. 4 illustrates a top elevational perspective view of a further embodiment of the apparatus for attaching fitments of the present invention.
Figure 5:
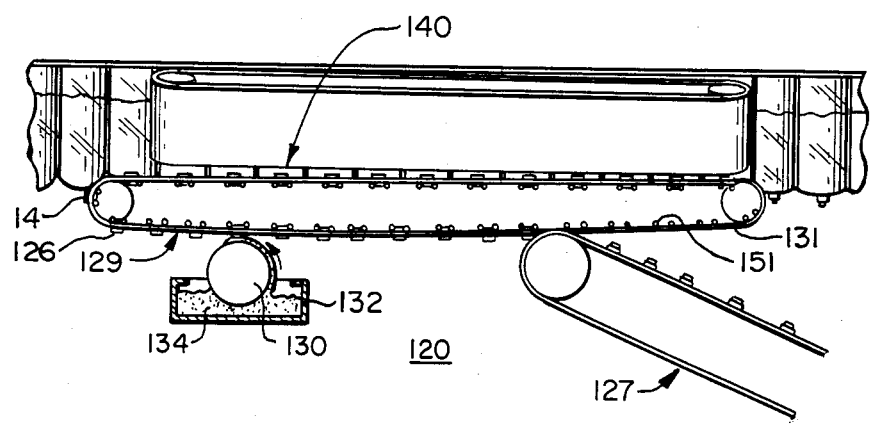
FIG. 5 illustrates a cross-sectional view of the apparatus for attaching fitments of FIG. 4.

FIGS. 4 and 5 illustrate a further embodiment of the fitment attaching apparatus 120 of the present invention. As set forth in this embodiment, a bin (not shown) delivers the fitments 12 to a first conveyor belt 127. The first conveyor belt 127 delivers the fitments 12 to a continuous conveyor belt 129 that includes a row of apertures 131. As in the prior embodiment, the apparatus 120 may include instead, a vibration table, worm screw, vibrator unit and chute or turntable. The fitments 12 are received within the row of apertures 131 of the conveyor belt 129. Again, the fitments 12 are oriented so that the bottom surface 24 and the fitments 12 extend outwardly from the conveyor belt 129.

As illustrated in FIG. 5, each aperture 131 includes a induction coil 151. As discussed in detail below, the induction coil 151 functions to weld the fitment 12 to the flexible container 20. In order to energize the induction coils 151 each induction coils is connected to a connector 150 that extends from an end of the conveyor belt 131.

In the embodiment illustrated, the fitments 12 are passed by a coating wheel 130 that is partially submerged in a bath 132 of particulate slurry 134. Accordingly, as the fitments 12 pass by the coating wheel 130 the bottom surface 24 of the fitments are coated with a layer of particulate slurry 134.

In a further embodiment of the fitment attaching apparatus (not shown), the fitments 12 are coated at a different station. The coated fitments are then fed to the conveyor belt with the coated side oriented up. Because the particulate slurry will dry to a nontacky state, it is possible to coat the fitments and store them for some time before utilizing them in the apparatus of the present invention.

The particulate slurry 134 is a mixture of finely ground energy absorbing material, e.g., ferrous iron, nickel, cobalt, etc., and a thermoplastic. Preferably, the thermoplastic has the same composition as the flexible container 20 to which the fitment 12 is to be bound. Preferably, the particulate slurry is maintained at a temperature of 300° F. to 600° F. Preferably, the particulate slurry is constructed from stainless steel and the thermoplastic is a blend or ethyl vinyl acetate, low density polyethylene and Kraton.

After the bottom surface 24 of the fitment 12 has been coated with a particulate slurry 134, the fitment is then urged into juxtaposition to the flexible container 20 so that particulate slurry 126 contacts the bottom surface 16 of the flexible container. The fitment 12 is then urged against the bottom surface 16 causing the particulate slurry 126 to adhere to the flexible container 14.

After the fitment 12 is urged against the bottom surface 16 of a flexible container 14, connectors 150 slide over an energizing terminal 117, the energizing terminal 117 is connected to a high frequency generator 115. The contact between the connectors 150 and the energizing terminal 117 causes the induction coil 151 to be energized by a high frequency induction generator 115. The induction coil 151 then electromagnetically bonds the fitment 12 to the flexible container 14. Because the particulate slurry 126 has conductive properties it is heated by the induction coil 151 through which alternating current is passing when it is energized. The amount of heat generated at the point of joining between the fitment 12 and container 20 is dependent on several factors: length of time the fitment 12 remains in the electromagnetic field; the concentration of the energy absorbing material in the particulate slurry 134; and the type of energy absorbing material used.

The induction coil 151 causes the particulate slurry 134 to seal to the flexible container 114 through induction welding. Induction welding provides the user with a controllable, reliable and reproduceable adhesion force. Moreover, this provides freedom from oversoftening, heat damaging, and distortion, while accomplishing rapid seals. Heat is generated directly at the interface, i.e., between the bottom surface 16 of the flexible container 14 and the fitment 12, which is critical because the flexible container is filled with fluid and therefore acts as a heat sink. Moreover, because the heat is generated directly at the interface, the heat sterilizes the contact area between the fitment 12 and container 20.

The high frequency induction generator 115 may be any induction generator known in the art. For example, the induction generator 115 may comprise a generator consisting of a high voltage transformer and rectifier which supplies direct current at high voltage to a self-excited vacuum tube oscillator. Typically, the generators have an output power of from 1 to 5 Kw and frequency range of 4 to 27 mHZ.

Induction generators 115 can be purchased from Lepel, of Maspeth, N.Y. The induction coil 151 may also be any induction coil known in the art. For example, the induction coil 151 may be a copper coil cooled by water.

Preferably, the fitments 12 are urged against the container 20 at a pressure of approximately 2 psi to about 6 psi. Preferably, the fitment and container are maintained in contact for one to three seconds after the induction coil is energized.

It is also possible for the fitments 12 to include a gasket (not shown) that is sealed to the bottom layer 24, or placed thereon, and is constructed of a particulate slurry. The fitments 12 with the gasket situated on the bottom layer 24 will then be fed by the continuous conveyor belt 129 against the flexible containers 14. The fitment 12 is then induction welded to the flexible containers 20 by the apparatus illustrated in FIGS. 4 and 5. Utilizing this embodiment eliminates the need for the coating wheel 130.

It should be understood that various changes and modifications to the preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

We claim:

1. An apparatus for attaching fitments to filled flexible containers comprising:
   means for coating a surface of the fitments with means for securing the fitments to the filled flexible containers;
   means for delivering the coated surface of the fitments in juxtaposition to a bottom end of the filled flexible containers;
   means for urging the coated surface of the fitments against the filled flexible containers; and
   a first and second conveyor belt for limiting the lateral movement of the flexible containers in response to means for urging, the first conveyor belt being located on a first side of the flexible containers and the second conveyor belt being located on a second side of the flexible containers.

2. The apparatus of claim 1 wherein the means for coating comprises a coating wheel.

3. The apparatus of claim 1 wherein the fitments are attached to the filled flexible containers without violating the environment of the containers.

4. The apparatus of claim 1 wherein the means for delivering is a continuous conveyor belt.

5. The apparatus of claim 1 wherein the means for securing the fitments to the filled flexible container is a hot melt adhesive.

6. The apparatus of claim 5 wherein the fitment is urged against the filled flexible container at a pressure of approximately 15 to about 20 psi for approximately 1 to about 3 seconds.

7. The apparatus of claim 1 wherein the means for securing the fitments to the filled flexible container is a particulate slurry.

8. The apparatus of claim 1 wherein:
the filled flexible containers are created in a form, fill and seal packaging apparatus; and
the apparatus for attaching is a component of the form, fill and seal packaging apparatus.

9. An apparatus for attaching fitments to filled flexible containers comprising:
means for coating a surface of the fitments with a particulate slurry for securing the fitments to the filled flexible containers;
means for delivering the coated surface of the fitments in juxtaposition to the filled flexible containers;
means for urging the coated surface of the fitments against the filled flexible containers; and
means for inductively welding the fitments to the filled flexible containers.

10. The apparatus of claim 9 including means for accuating the means for inductively welding.

11. The apparatus of claim 9 wherein the means for inductively welding includes an induction coil and an induction generator.

12. An apparatus for attaching fitments to flexible containers for housing product comprising:
means for coating a surface of the fitments with a means for securing the fitments to the containers after the containers have been filled and without violating the environment of the containers;
a conveyor belt for delivering the fitments in juxtaposition to the filled flexible containers; and
means for urging the coated surface of the fitments against a bottom of the filled flexible containers, means for limiting the lateral movement of a first and a second side of the container in response to the means for urging, the means for urging cooperating with the means for limiting to secure fitments on the flexible containers.

13. The apparatus of claim 12 wherein the means for limiting the lateral movement includes at least one conveyor belt.

14. The apparatus of claim 12 wherein the means for coating is a coating wheel.

15. The apparatus of claim 12 wherein the means for securing is a hot melt adhesive.

16. The apparatus of claim 15 wherein the fitments are urged against the flexible containers at a pressure of approximately 15 to about 20 psi for approximately 1 to about 3 seconds.

17. The apparatus of claim 12 wherein the means for securing is a particulate slurry.

18. An apparatus for attaching fitments to flexible containers for housing product comprising:
means for coating a surface of the fitments with a particulate slurry for securing the fitments to the containers after the containers have been filled and without violating the environment of the containers;
a conveyor belt for delivering the fitments in juxtaposition to the filled flexible containers;
means for urging the coated surface of the fitments against a bottom of the filled flexible containers;
means for limiting the lateral movement of a first and second side of the container in response to the means for urging, the means for urging cooperating with the means for limiting to secure fitments on the flexible containers; and
means for sealing the fitments to the flexible containers through induction welding.

19. The apparatus of claim 18 wherein the means for sealing the fitments includes:
an induction coil; and
an induction generator.

20. An apparatus for attaching fitments to filled flexible containers in a form, fill and seal apparatus comprising:
means for urging the fitments against a bottom surface of the filled flexible containers;
means for exerting a force on a first and second side of the flexible containers to limit lateral movement of said first and second sides for at least a portion of the time the fitments are urged against the bottom surface; and
means for sealing the fitments to the filled flexible containers.

21. The apparatus of claim 20 wherein the means for exerting the force includes a first and a second conveyor belt.

22. An apparatus for attaching fitments to filled flexible containers in a form, fill and seal apparatus comprising:
means for urging a bottom surface of the fitments against the filled flexible containers;
means for exerting a force on a first and second side of the flexible containers for at least a portion of the time the fitments are urged against the bottom surface;
means for sealing the fitments to the filled flexible containers;
the bottom surface of the fitments including an electromagnetic responsive filler layer; and
the means for sealing the fitment to the filled flexible containers includes means for generating radio frequency electromagnetic fields.

23. The apparatus of claim 22 wherein:
the electromagnetic responsive filler layer is a gasket constructed from a particulate slurry; and
the means for generating radio frequency electromagnetic fields includes an induction coil and induction generator.

24. A method for creating a flexible container with a fitment comprising:
folding a web of film;
sealing a web of film on two sides;
filling the sealed web of film;
sealing the web of film on a third side;
delivering a fitment in juxtaposition to the flexible container;
urging the fitment against a bottom end of the the flexible container;
limiting the lateral movement of a first and a second side of the flexible container; and
sealing the fitment to the filled flexible container.

25. The method of claim 24 including the step of coating the fitment with a means for sealing the fitment to the flexible container.

26. A method for creating a flexible container with a fitment comprising:
folding a web of film;
sealing a web of film on two sides;
filling the sealed web of film;
sealing the web of film on a third side;
delivering a fitment in juxtaposition to the flexible container;
limiting the lateral movement of a first and second side of the flexible container; and
sealing the fitment to the filled flexible container by induction welding the fitment to the container.

* * * * *